(12) United States Patent
Kienzler et al.

(10) Patent No.: US 10,336,224 B2
(45) Date of Patent: *Jul. 2, 2019

(54) DEVICE FOR VENTILATING A VEHICLE SEAT AND USE OF SAID DEVICE FOR A PASSENGER VEHICLE SEAT

(71) Applicant: EBM-Papst St. Georgen GmbH & Co. KG, St. Georgen (DE)

(72) Inventors: Andreas Kienzler, St. Georgen (DE); Andreas Kuhlmey, Schramberg (DE); Gerhard Kuhnert, VS-Villingen (DE); Jochen Wernet, Bräunlingen-Döggingen (DE)

(73) Assignee: EBM-Papst St. Georgen GmbH & Co. KG, St. Georgen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/514,131

(22) PCT Filed: Aug. 27, 2015

(86) PCT No.: PCT/EP2015/069666
§ 371 (c)(1),
(2) Date: Mar. 24, 2017

(87) PCT Pub. No.: WO2016/096171
PCT Pub. Date: Jun. 23, 2016

(65) Prior Publication Data
US 2017/0291517 A1  Oct. 12, 2017

(30) Foreign Application Priority Data

Dec. 18, 2014 (DE) .................. 10 2014 119 041
Apr. 24, 2015 (DE) .................. 10 2015 106 306

(51) Int. Cl.
A47C 7/72 (2006.01)
A47C 31/00 (2006.01)
B60N 2/56 (2006.01)

(52) U.S. Cl.
CPC .......... B60N 2/565 (2013.01); B60N 2/5642 (2013.01); B60N 2/5657 (2013.01); B60N 2/5685 (2013.01)

(58) Field of Classification Search
CPC ...... B60N 2/5657; B60N 2/5642; B60N 2/68; A47C 7/744; A47C 7/74; H05B 1/0238
See application file for complete search history.

(56) References Cited

U.S. PATENT DOCUMENTS 6,626,488 B2 * 9/2003 Pfahler .................. A47C 7/744
297/180.11
6,869,139 B2 * 3/2005 Brennan .................. A47C 7/74
297/180.1

(Continued)

FOREIGN PATENT DOCUMENTS

| DE | 198 51 649 C1 | 4/2000 |
| DE | 20 2012 103 921 U1 | 2/2014 |
| WO | 2006/105869 A1 | 10/2006 |

OTHER PUBLICATIONS

International Search report for Application No. PCT/EP2015/069666 dated Nov. 17, 2015.

*Primary Examiner* — Shin H Kim
(74) *Attorney, Agent, or Firm* — Bachman & LaPointe, PC

(57) ABSTRACT

A device for ventilating a vehicle seat having a cushion (12) which is resilient with respect to user contact and which is constructed to form a seat and/or back contact face (24) and which has an air flow channel (16, 17) which forms an air outlet (15) in the direction toward the seat or back contact face, an air-permeable covering unit (18) which is formed in (Continued)

order to at least partially cover the air outlet and which is preferably constructed so as to be rigid and/or grid-like, and a ventilator rotor (30) which is associated with the air flow channel and which is driven in an electro-motive manner and a ventilator unit (14) which has a ventilator housing (32) which at least partially radially surrounds the ventilator rotor, characterized in that the covering unit and the ventilator unit are fixed on or in the cushion with spacing from each other along the air flow channel and without direct connection of portions of the covering unit and the ventilator unit, and the ventilator housing has at the peripheral and/or outer side first fixing means (34; 32; 80) which are constructed in order to secure the ventilator unit in the air flow channel by engaging in and/or in order to cooperate with second fixing means (12; 70; 74) which are provided on or in an inner wall portion of the air flow channel.

18 Claims, 2 Drawing Sheets

(56) References Cited

U.S. PATENT DOCUMENTS

| | | | | |
|---|---|---|---|---|
| 7,083,227 B2* | 8/2006 | Brennan | ............... | A47C 7/74 297/180.14 |
| 7,131,689 B2* | 11/2006 | Brennan | ............... | A47C 7/74 297/180.14 |
| 7,478,869 B2* | 1/2009 | Lazanja | ............... | B60N 2/5635 297/180.13 |
| 7,735,932 B2* | 6/2010 | Lazanja | ............... | B60N 2/5635 297/452.47 |
| 7,775,602 B2* | 8/2010 | Lazanja | ............... | B60N 2/5635 297/180.12 |
| 7,862,113 B2* | 1/2011 | Knoll | ............... | B60N 2/5635 297/180.13 |
| 7,866,017 B2* | 1/2011 | Knoll | ............... | B60N 2/5635 29/91.1 |
| 7,971,931 B2* | 7/2011 | Lazanja | ............... | B60N 2/5635 297/180.12 |
| 8,162,391 B2* | 4/2012 | Lazanja | ............... | B60N 2/5635 297/180.12 |
| 8,360,517 B2* | 1/2013 | Lazanja | ............... | B60N 2/5635 297/180.14 |
| 8,704,477 B2* | 4/2014 | Brown | ............... | G05B 11/16 297/180.13 |
| 8,899,675 B2* | 12/2014 | Wu | ............... | A47C 7/744 297/180.16 |
| 8,960,791 B2* | 2/2015 | Dry | ............... | B60N 2/90 297/218.3 |
| 9,440,567 B2* | 9/2016 | Lazanja | ............... | B60N 2/5635 |
| 9,854,915 B2* | 1/2018 | Miron | ............... | A47C 7/744 |
| 2002/0105213 A1* | 8/2002 | Rauh | ............... | B60H 1/00285 297/180.14 |
| 2003/0132650 A1* | 7/2003 | Bargheer | ............... | B60N 2/5628 297/180.13 |
| 2005/0173950 A1* | 8/2005 | Bajic | ............... | A47C 7/72 297/180.14 |
| 2007/0176471 A1* | 8/2007 | Knoll | ............... | B60N 2/5635 297/180.14 |
| 2009/0113690 A1* | 5/2009 | Knoll | ............... | B60N 2/5635 29/428 |
| 2018/0022251 A1* | 1/2018 | Kienzler | ............... | B60N 2/565 |

* cited by examiner

DEVICE FOR VENTILATING A VEHICLE SEAT AND USE OF SAID DEVICE FOR A PASSENGER VEHICLE SEAT

BACKGROUND OF THE INVENTION

The present invention relates to a device for ventilating a vehicle seat. The present invention further relates to a use of such a ventilation device.

Seat ventilation devices are generally known from the prior art; whereas, for example, in the field of higher-value motor vehicles generically known devices for supplying air to users which are in contact with a seat and/or back contact face in the operating state of a vehicle seat and which are acted on with air which is drawn in by the ventilator unit—generally from the vehicle interior—and which is discharged through the seat or back contact face, are becoming increasingly popular. The use of a seat ventilation device of the type described so as to increase comfort and safety, for instance, has been carried out and found to be advantageous for a long time in aircraft, construction, agricultural or military vehicles, and particularly in operating environments which are particularly demanding.

Conventionally, for the purpose of air supply to the seat or back contact face, a cushion which is generally produced from a suitably resilient foam material for the seating purposes of the user is provided with a through-channel as an air flow channel in such a manner that the ventilator unit which is generally received in a ventilator housing in a modular manner draws in the incoming air through this channel and then discharges it at the outlet side to the seat or back contact face, wherein this outlet is often provided with a covering unit which is rigid and air-permeable in a manner known from the prior art. That covering unit primarily has the purpose of preventing inadvertent sinking of a user in the event of point-like weight loading of the cushion—the so-called "knee test"—wherein, to this end, the covering unit which is typically constructed in a grid-like manner brings about a substantially planar and fixed covering of the ventilator outlet at the end of the user-side end of the air flow channel.

In devices which must be presumed to be known from the prior art, this covering unit is typically constructed as a closure or end-side delimitation of the ventilator housing, wherein, in particular from the point of view of large-batch production and in order to implement the described modular notion, those subassemblies can then be integrated, often also integrally, by suitable plastics injection-molding technologies in order thus to allow a cost-effective capacity for production with easy assembly properties, that is to say, by simple introduction into the flow channel in the cushion.

A layer (which is flat and narrow relative to the cushion) comprising a material which is air-permeable and therefore which conducts air along or parallel with the seat or back contact face is then often further applied to the seat or back contact face of the (foam) cushion with the objective of ensuring a discharge of air which is distributed over a surface-area to the greatest possible extent and which is adapted to the anatomical user conditions of the seated user for a covering layer which is then tensioned thereon (for example, a leather seat cover which is suitably perforated for the discharge of air).

While particularly in the case of detrimental ambient temperatures in the vehicle such seat ventilation technologies can significantly increase the driving comfort of the user and therefore a passive operating reliability of the vehicle which is equipped in this manner; nevertheless, the technology which is presumed to be known in a generic manner and in accordance with the preamble of claim 1 has been found to be in need of improvement, with particular regard to the particular ventilation and fitting conditions of a vehicle seat: an axial ventilator which is usually introduced in the context of the generic ventilator unit as a ventilator motor is dimensioned, together with the additional components of the air flow chain, so that a conveying volume can be achieved in the range between approximately 4 liters/sec. and approximately 10 liters/sec., wherein typical seat contact faces of motor vehicles have a plurality of air flow channels (which are spaced apart from each other and separated in terms of flow) together with the respective ventilator units and covering units. With respect to the dimensions of the ventilator, including an achievable diameter of the ventilator rotor, the radial construction space is initially limited, for example, by the problems described in the introduction in that non-homogeneities in the (foam) cushion have a negative effect on the support properties of the cushion and the seating comfort, wherein, for example, an excessively large diameter of the described covering unit (since it is itself rigid) could also potentially be detrimental to comfort. In addition, there is the problem that the plurality of mutually adjacent air flow channels generally intended to be provided in the same cushion have to have a sufficient minimum spacing from each other in order to ensure a stable retention or securing action of the ventilator units on or in the cushion.

In order, in view of these geometric limitations of the installation conditions in the vehicle seat and the (radial) ventilator diameter which is thereby limited, nevertheless to ensure a high air transport volume, it is conventional to produce ventilator units which are used for ventilating seats at high ventilator speeds of the ventilator rotor; these may be up to 10,000 rpm.

However, it has been found to be disadvantageous in the context of the invention that there occur, during operation of a ventilator rotor at such high rotation speeds, vibrations which are transmitted to the user via the rigid covering unit and which can impair the seating comfort in a significant manner. This is why it has thus been found that speeds in the range mentioned can produce an oscillation excitation of the system comprising the covering unit and the ventilator housing, with the disadvantageous effect that resonance frequencies which have just been excited may in this instance lead to considerable vibration effects and the described losses of comfort. In addition, there is potentially disruptive noise generated and the potential risk of mechanical impairments of the ventilator motor which drives the ventilator rotor together with bearings in such resonance situations.

SUMMARY OF THE INVENTION

In order to solve this problem, in the context of the invention there is provision for carrying out a mechanical or technical decoupling in terms of vibrations between the covering unit, on the one hand, and the ventilator unit, on the other hand, in the cushion in such a manner that both components or subassemblies which are provided along the air flow channel at the end side or therein in a suitable manner are not connected by structural elements or subassemblies which are rigid or which allow a transmission of vibrations, but instead the mechanical connection is brought about simply by the material of the cushion (which material is generally produced from a foam material which is also referred to below as a foam material or foam rubber material). As a result of the inherent resilience or vibration damping effect thereof, therefore, the resonance vibration context described above as being problematic is advantageously overcome. At the same time, there is produced by this variant the challenge of fixing the ventilator housing of the ventilator unit surrounding the ventilator rotor in a stable, operationally reliable manner and with spacing in the manner described on or in the air flow channel, wherein such fixing has to be sufficiently stable and durable to still retain the ventilator unit in a reliable manner at the provided position in the air flow channel after many years of use of the vehicle seat by heavy users.

The object is achieved by the device for ventilating a vehicle seat having the features disclosed herein; advantageous developments of the invention are described in the dependent claims. Additional protection in the context of the invention is claimed for a use of such a ventilation device for a passenger vehicle seat which uses the ventilation device according to the invention in a particularly efficient and operationally reliable manner which is favorable in technical production terms. In the context of the invention, in this instance the term "vehicle" is intended to be interpreted broadly and also includes in addition to conventional land vehicles for private, commercial, agricultural and military purposes in particular aircraft and water-borne vehicles so that the advantages according to the invention can be achieved in a great range of suitable application contexts.

According to the invention, therefore, there is first provided the covering unit, in the direction of the air flow channel in the cushion with spacing from the ventilator unit, wherein this spacing is produced only by the material of the cushion, that is to say, typically a foam material (which is resilient in accordance with the padding purposes of the vehicle seat), without any provision of additional mechanical connection components between the subassemblies covering unit and ventilator unit, wherein in particular those subassemblies are not connected to each other, for instance, directly at respective portions, for instance, with respect to the prior art which is taken to form the generic type.

In this instance, the term "resilient" used according to the invention with regard to the cushion is intended to be understood to mean that the padding and cushioning effect conventional in vehicles is thereby ensured for a user who is sitting (in the case of a seat cushion) or leaning (in the case of a rear cushion) thereon; in particular, the covering unit should be considered to be rigid according to the invention with respect to such a resilient cushion, that is to say, with the primary effect that a material rigidity of the covering unit—which is constructed as a grid in a particularly preferred and favorable manner—prevents the disadvantageous effect described in the introduction of a user sinking in the case of point-like weight loading in the region of the outlet.

This method ensures an effective vibration and noise decoupling between the (vibration-producing) ventilator unit and the covering unit (which is necessarily rigid for rigidification), wherein the present invention in the preferred embodiment, that is to say, without the provision of any additional connection elements outside the cushion material itself, uses the cushion in a synergistic manner with a doubly advantageous functionality: on the one hand, the (foam) material of the cushion (which material is even substantially non-air-permeable) ensures a sufficiently stable fixing of the covering unit, on the one hand, and the ventilator unit, on the other hand, in fixed relative positions with spacing from each other, wherein the covering unit is positioned or introduced on or in the outlet-side end of the cushion, while the ventilator unit is suitably provided in the subsequent extent of the air flow channel, preferably in a central assembly position and therefore with spacing both from the outlet side and preferably from an opposing opening side of the air flow channel. Similarly, the invention has adopted the favorable vibration damping properties of the foam material which is intended to be used advantageously and according to a development in order to produce the cushion and which therefore absorbs and damps the potentially disadvantageous effects of vibration excitation, vibration and structure-borne noise in a completely effective manner.

In addition, the ventilator housing has according to the invention at the peripheral and/or outer side the first fixing means which are constructed in order to secure the ventilator unit in the air flow channel by engaging in and/or in order to cooperate with second fixing means which are in turn provided on or in an inner wall portion of the air flow channel. In different variants which will be explained below, it is thereby ensured by preferred embodiments of the invention that in the intended manner the ventilator unit can be decoupled, on the one hand, with spacing and in terms of vibrations and, on the other hand, can be secured in the cushion in a mechanically secure and durable manner so as to be able to be produced in large batches.

As a result, therefore, the present invention allows in a surprisingly simple manner the disadvantages which are established from the prior art to be overcome by the material-related functionality of the cushion being used both for the subassembly covering unit and the ventilator unit being fixed according to the invention with decoupling and spacing, by this material with the damping properties thereof achieving the desired vibration and structure-borne noise decoupling and furthermore by it being ensured by the first and second fixing means provided according to the invention that the ventilator unit can be coupled in a reliable and operationally reliable manner so as to be able to be produced in large batches in the air flow channel which is constructed in the cushion in the manner with spacing according to the invention.

Against the background of possible use of existing (foam) cushion configurations with already-provided openings for producing the air flow channel for the purposes of retrofitting, it is preferable according to a development and included by the invention to construct the air flow channel so as to extend through the cushion in a transverse direction relative to the seat or back contact face so that an air flow direction extends as an axial direction through the air flow channel substantially perpendicularly to the seat or back contact face.

In order to optimize the geometric relationships on or in the cushion, and to be able to adapt them in a suitable manner to conditions in the flow and air conveying behavior of the ventilator unit, it may be advantageous and preferable according to another embodiment of the invention which is intended to be provided additionally or alternatively to the above-mentioned variants to expand the diameter of the air flow channel at the end side in the direction toward the air outlet, wherein this can be carried out in a conical or stepped manner or with a curved shape in longitudinal section; in addition to influencing the flow space, it is also thereby possible to optimize a receiving member for the covering unit which is intended to be introduced at the end side.

Whereas the inventively critical components cushion, covering unit and ventilator unit are positioned and fixed relative to each other according to the invention, it is nevertheless advantageous and preferable in a development to carry out the integration in a vehicle seat by applying a layer of an air-permeable material as an air conducting layer and a covering layer thereon for producing the actual seat surface (suitable and otherwise known, comprising textile material, leather or plastics material with suitable openings, for example, perforations), which vehicle seat is also in accordance with the invention and is advantageously claimed in a development as a direct implementation of the invention.

In this instance, the extensive covering of the cushion as provided according to the development with the air-permeable material is intended to be understood to be a continuous, uninterrupted coverage of at least 50% of the seat or back contact face, preferably at least 80%, more preferably at least 60%, more preferably at least 75% of the seat or back contact face of the cushion.

In this instance, it is again possible in a development to provide under the covering layer—and in a manner which is otherwise known per se—a seat heating unit in the form of an arrangement which is intended to be applied in a suitable manner as a layer and which comprises heating wires which are intended to be heated electrically so that the device according to the invention can further be supplemented in order to also ventilate by means of an electrical heat production functionality.

Again as a variant, a heating device can also be associated with the air flow channel in a suitable manner and, for example, heats the drawn-in or incoming air before it is discharged to the seat or back contact face so that, for example, the intended comfort-increasing ventilation effect can be extended effectively to particularly cold operating or ambient conditions of a vehicle which is ventilated in this manner.

In this instance, the terminology used in the context of the present invention is intended to be understood in such a manner that transposed functionalities are also intended to be included by the invention: thus, the terminology according to the main claim is based on an operating method which, although preferable, is not exclusive in respect of the ventilator unit as a ventilator which discharges drawn-in air through the outlet according to the invention into the seat or back contact face. However, there is also similarly included by the invention a transposed operating mode in which a ventilator rotor (which is accordingly driven in opposition) draws in air through the air outlet in the seat or back contact face and then discharges it in a suitable manner into the vehicle interior at the opposite end of the air flow channel. In a manner which is evident to the person skilled in the art, the ventilation purpose of the vehicle seat is also achieved by such a mode.

In order to produce the first fixing means according to the invention with respect to the ventilator housing or the second fixing means which are intended to be associated with the air flow channel, different variants are conceivable and possible in the context of the invention and each allow different advantages or advantageous effects per se.

Thus, on the one hand, there is provision in the context of the invention in a structurally and mechanically simple manner for the material (which is typically produced as a foam material) of the cushion to act on the ventilator housing at the peripheral or outer side and to fix it in a suitable manner, for example, by means of corresponding dimensions which compress the foam material. In this regard, the second fixing means according to the invention would then be intended to be understood as suitably a press-fit or the like, dimensions which allow fixing based on material compression in respect of the air flow channel which is constructed, for example, in a hollow-cylindrical manner in the cushion. In order to improve the retention effect, the first fixing means which are provided on the ventilator housing at a peripheral or outer side can then be constructed as projections of different types, for example, in a flange-like manner, in the form of needle-like or pointed portions—which are provided in a further preferable manner in a state distributed at the outer side and which project radially—or so as to taper in a flat or acute manner in another manner, in a conical, tapering manner, or the like.

In this case, on the one hand, in the context of developments of the invention, it is included that such projections or flange portions which also extend in particular radially in a claw-like manner from an outer covering face of the ventilator housing are received only by suitable flexible/compressible material selection of the (foam) material. Alternatively, however, it is also included by the invention that suitable slots, recesses, grooves, undercuts or similar material removals be carried out in the material of the cushion so that it is then possible to receive in this instance suitably orientated and, for example, flange-like projections of the first fixing means, where applicable again with reduced dimensions for the additional fixing.

These fixing structures can also again advantageously be produced, for example, for the purposes of automated usability, an improvement to a seat or a retention in the cushion, or the like, in the form of bayonet closure-like structures, that is to say, in the manner of a lifting/catch coupling, which combines both an—axial—lifting movement and a rotational movement with each other.

Another alternative method for the preferred construction of the invention in the context of the dependent claims makes provision for introducing the first fixing means, particularly constructed as radially projecting projection or flange portions, in surrounding foam material of the cushion (as a second fixing means) in such a manner that this introduction already takes place during the cushion production, that is to say, by means of embedding, foam-coating or injection-molding with the foam-like or foamed cushion material. This variant of the invention can be automated to a particular extent and is distinguished by a high level of reproducibility, for example, of the positioning, the material selection and the operating properties.

In the context of the invention and in order to produce variants of the invention, there is again provision as an alternative for producing the second fixing means as a rigid subassembly, that is to say, for example, from a rigid plastics material by means of injection-molding or the like. Such a subassembly could be constructed, for example, in the manner of a ring, on the one hand, in order to be connected—at the inner side—to the ventilator housing (more specifically, the fixing means which are provided thereon and which are, for example, flange-like) and could be securely embedded at the outer side, for example, in the manner described above in a surrounding foam material of the cushion so that in particular introduction (in this instance, then, also releasable introduction) of the ventilator unit during assembly is allowed. In this instance, the possibilities of configuring a locking system (in a releasable or non-releasable manner) are also freely selectable and are dependent on an intended purpose; in particular snap-fit, clip-fit and catch connections or the like may be brought about in addition to, for instance, the lifting/rotation connection already described above.

In the context of additional embodiments of the invention, there is again provision as an alternative for the first and second fixing means according to the invention to be constructed in that an outer, cover-side portion (which is freely constructed in principle) of the ventilator housing is connected in a non-releasable manner to an inner-side wall portion of the ventilation channel by adhesive bonding, welding or in some other manner. In the case of adhesive bonding, adhesive would further act as a connection material. In the case of materials which can be thermally melted in a suitable manner, such a (non-releasable) connection would also be able to be brought about simply using the suitably selected foam material of the cushion or a plastics material of the ventilator housing.

In the context of preferred developments of the invention, there is further provision for providing the preferred construction of the cushion with a foam material not in continuously homogeneous form (or as a uniform material), but instead it may be advantageous in the region of the arrangement of the ventilator unit in the air flow channel in accordance with a respective fixing purpose to produce a region or portion of the cushion from a material, for example, a foam material, which has properties (which improve, for example, the introduction and retention of the ventilator unit) which are changed with respect to a surrounding (foam) material of the cushion, for example, with regard to resilience, compressibility, strength, adhesion or (thermal) melting properties.

It has been found that with each of the variants which constitute developments according to the invention, ventilator units of the generic type can be arranged in the air flow channel and can be fixed at that location in a particularly simple, operationally reliable manner which is suitable for large-batch production so that the advantage of the decoupling in terms of vibrations is brought about in a simple and efficient manner. As a result, the preferred use of the invention in the context of a passenger vehicle seat, in particular also with regard to the high production batch quantities which may be anticipated at that location, is a preferred use but the invention is not limited to this application field.

BRIEF DESCRIPTION OF THE DRAWINGS

Other advantages, features and details of the invention will be appreciated from the following description of preferred embodiments and the drawings, in which.

DETAILED DESCRIPTION

Figure 1:
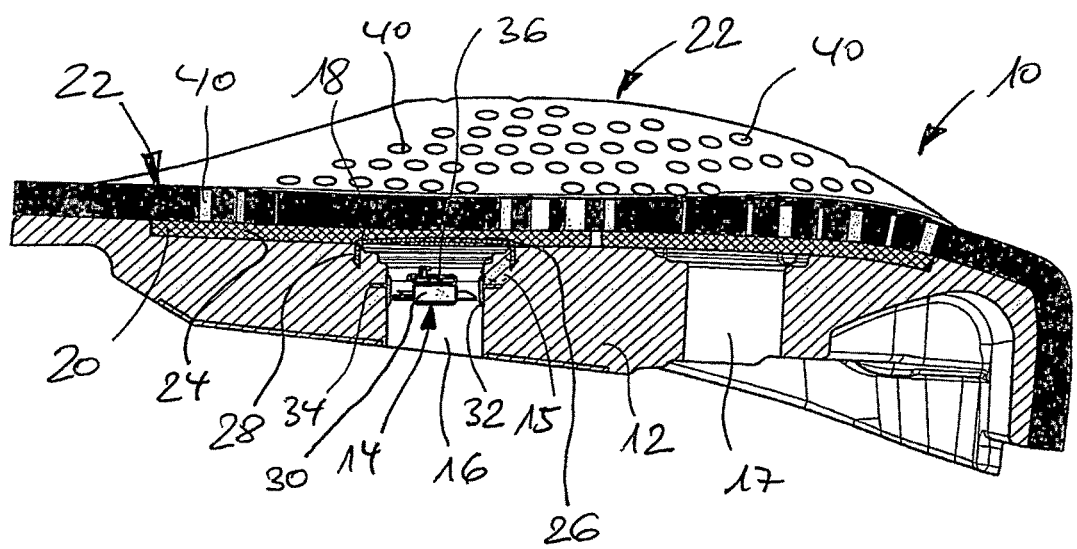
FIG. 1 is a sectioned side view of the device for ventilating a vehicle seat according to a first embodiment of the invention with additional layers.

FIG. 1 explains, in the sectioned side view, a seat region 10 of a vehicle seat, in which the ventilation device of the embodiment shown, having a cushion 12, a ventilator unit 14 retained therein and a covering unit 18, which covers an air flow channel 16 in the cushion 12 at the outlet side, are covered by a layer 20 of an air-permeable material as a horizontal air guide which again has at the covering side an outer covering 22 of a leather seat material, on which a user (not shown in the Figures) then sits.

More specifically, as shown in the illustration of FIG. 1, the cushion 12 has a plurality of air flow channels (typically four, wherein the sectional view shows two in the form of channels 16, 17) which in a state extending vertically in the plane of the Figure extend through the foam material of the cushion 12 and in this regard extend with the flow direction thereof (which similarly extends vertically) perpendicularly to the seat contact face 24 which is defined by the surface of the cushion 12.

As can further be seen in the sectional view of FIG. 1, the channels 16, 17 which are constructed as openings in the foam material of the cushion 12 and which have a substantially cylindrical inner contour are illustrated at the outlet side, that is to say, in the direction toward the air-permeable layer 20 positioned thereon, with a cross-sectional extent and opening extent which increase in a stepped manner, wherein the air outlet which is formed in this manner is then covered in the manner shown by the covering unit 18 which is constructed as an integral injection-molding component from a plastics material (cf. the detailed view of FIG. 2), and which has a grid which is spanned by a frame and which extends substantially horizontally in order to allow the air which is conveyed from the (respective) air outlet to pass through with low flow resistance. As FIG. 2 explains, integrally formed-on hook portions 28 which are constructed in the manner shown in FIG. 1 in order to be inserted at the peripheral side and to be secured in the foam material by means of an end-side counter-hook, are located at the peripheral side on the frame portion 26 of the covering unit 18. The reference numeral 15 indicates the stepped increase of the channel 16 as can be seen in the direction toward the outlet opening.

As FIG. 1 explains, no connection elements are provided outside the foam material of the cushion 12 for vibration, noise and movement damping (and therefore decoupling) between the subassemblies 18 and 14; instead, those subassemblies are spaced apart from each other by a spacing which in the embodiment shown is slightly less than 50% of the radial diameter r of a ventilator wheel 30 of the ventilator unit 14 which is constructed as an axial ventilator. The ventilator wheel 30 runs in a ventilator housing 32 which cylindrically surrounds it and which in the first embodiment shown here has a radially outwardly extending annular flange 34 in a state located integrally thereon for fixing purposes, which flange engages in a groove in the foam material of the cushion in a retaining manner. In the central axial region of the ventilator wheel 30 there is shown an electronic control unit which is otherwise conventional and which is designated 36 for the ventilator unit.

As further explained in FIG. 1, the covering coating 22, in the embodiment illustrated comprising seat leather which is otherwise non-air-permeable, has in order to allow air to pass through to the seated user a plurality of perforation-like openings 40 which expose the flow path through the air-permeable (horizontally extending) layer 24 in an outward direction toward the user. In the embodiment shown and with corresponding control of the ventilator unit 14, air would be accordingly drawn in (from the interior of the vehicle) from below into the air flow channels 16, 17 and, as a result of the action of the rotors 30, can then be discharged through the outlet of the channels 16, 17, the covering unit 18 which is associated, the layer 24 which is jointly air-permeable and respective openings 40 which act in the manner of nozzles in the covering coating 22.

In this instance, it is possible according to the invention to operate the respective ventilator units at high ventilator speeds without having to fear vibrations which are potentially detrimental to comfort and function because in the manner shown not only does the foam material of the cushion 12 reliably mutually secure the functional components involved in the relative position spaced apart from each other but it also prevents any perceptible transmission of vibrations, movement and noise by means of damping.

Figure 2:
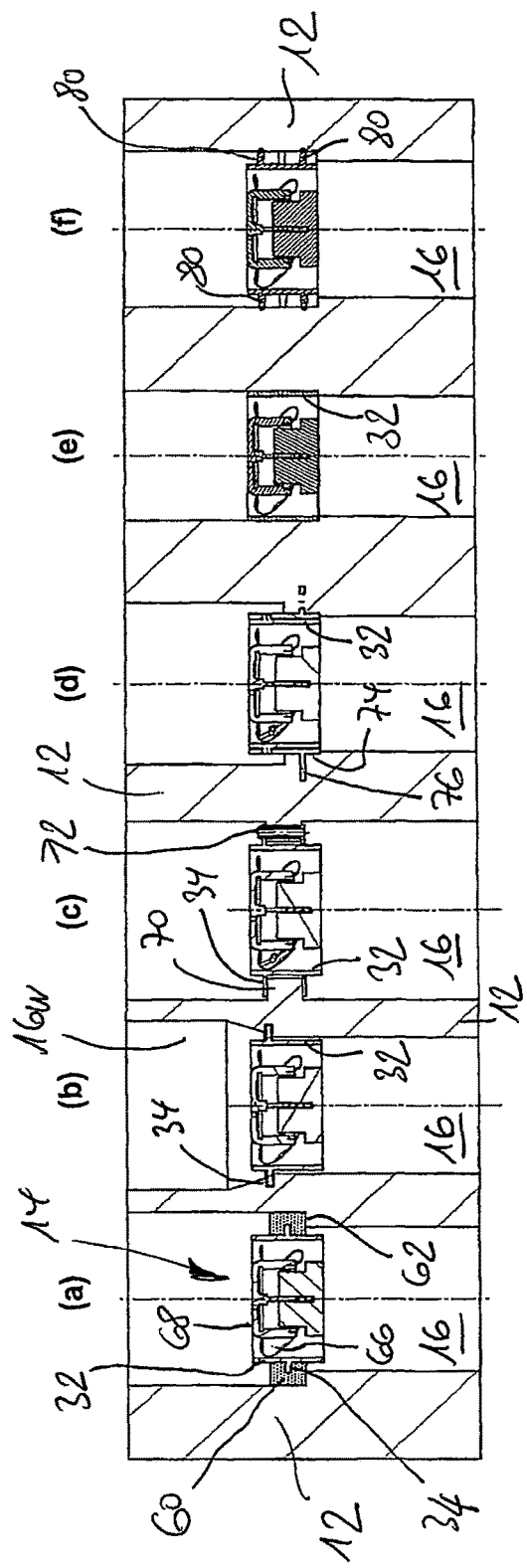
FIG. 2, FIG. 3 are a longitudinally sectioned view (FIG. 2) and a plan view (FIG. 3) of variants which are arranged beside each other by way of example in order to produce the first and second fixing means according to the invention for fixing the ventilator housing in the air flow channel in accordance with the variants (a) to (f)
Figure 3:
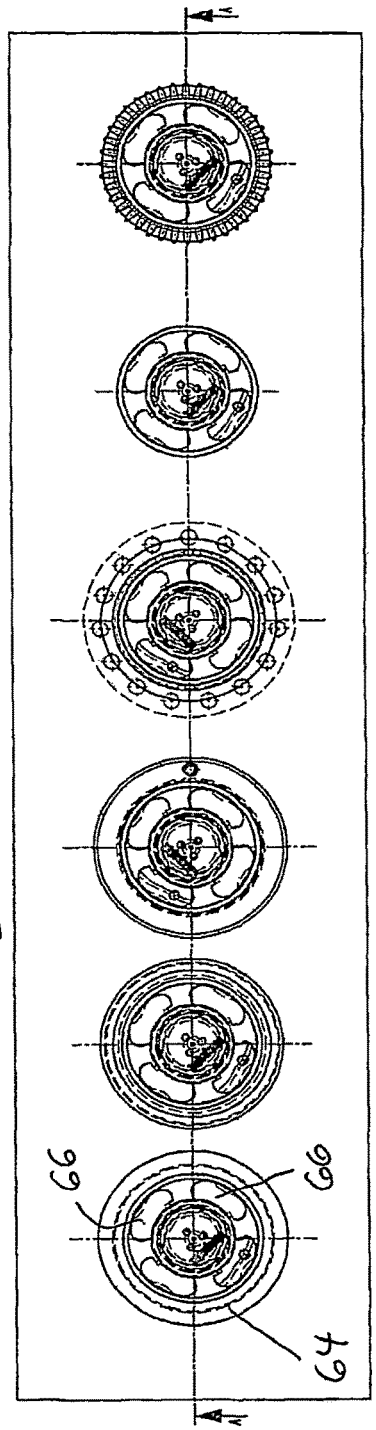

FIGS. 2 and 3 show as a comparison different variants as possible construction forms and embodiments of the invention, as to how the ventilator unit 14 can be fixed or secured in the channel 16 in the above-described manner with spacing and in a decoupled state in the surrounding cushion of the foam material 12. Whereas FIG. 3 shows with these variants (a) to (f) respective plan views of embodiments which are shown adjacent to each other by way of example and in a varied manner, FIG. 2 contains longitudinal sections along the line of section A-A from FIG. 3, in this regard in accordance with a longitudinal axis of a respective one of the channels 16 extending perpendicularly in the plane 2 of the Figures. In the variants (a) to (f), the same reference numerals indicate identical or mutually equivalent subassemblies and components.

Thus, the embodiment (a) in FIG. 2, FIG. 3 first shows an arrangement in which the cylindrical ventilator housing 32 is secured with the radially protruding, planar flange portion 32 in an annular elastomer member 60 which in a state constructed in a foam-like manner is located on an annular shoulder 62 which is formed at the inner side in the foam material 12, and in this regard determines an axial position. There is formed in the flexible member 60 an annularly extending slot 64, in which the annular flange 32 (or the portions thereof) engage in order thereby to fix the ventilator unit 14 in an axial and radial direction in the channel 16. As in the other embodiments, the reference numeral 66 also indicates vanes of an external rotor 68 of the ventilator unit; electronic components for controlling this unit are not shown in the examples.

The embodiment (b) explains how a ventilator housing 32 is fitted in a (hollow-cylindrical) channel 16 with planar flanges 34 which extend radially outwardly in such a manner that the outer covering region of the cylindrical housing shell 32 is fitted in the air flow channel 16 in the manner of a press-fit arrangement. A widened portion 16w (shown at the top in the portion (b) of FIG. 2) of the channel 16 allows, on the one hand, the insertion of the ventilator unit 14 with the edge-side flanges 34 and, on the other hand, those unsuitably deformable portions engage in the transition region between the widened and the tapered diameter of the channel 16 so that to that extent an axial positioning of the arrangement (b) is possible. In this embodiment, the second connection means according to the invention are therefore a correspondingly constructed cross-sectional structure (which widens in this case) of the channel 16, wherein the inner channel diameter further allows the described press-fit.

Embodiment (c) makes provision for how the housing 32 engages on an annular portion 70 (which is integrally located on the material 12 or is fixed thereto as a separate subassembly) which extends radially from an inner wall of the channel 16 in the direction toward a center axis. In the embodiment (c) shown on the left, a pair of flange portions 34 engages over this annular attachment; alternatively an annular intermediate piece 72 can also be mounted, in the right region of (c).

Embodiment (d) shows a variant of the invention in which a rigid outer ring 74, again with a radially projecting flange portion 76, is rigidly secured on or in the foam material 12 which surrounds it at the outer side.

This securing may already have been carried out, for example, during the production of the foam member 12 by suitable foam-coating, shaping or the like, in respect of the subassembly 74. The cylindrical housing shell 32 can now be suitably inserted and fitted in this outer ring 74 acting as a second fixing means according to the invention and can preferably be fixed and locked, for instance, by a bayonet type connection; to this end, suitable projections on the housing 32 would engage in associated profile grooves or undercuts of the outer ring member 74 and would thus bring about the bayonet connection which is otherwise known. It is further possible, as an additional variant which is not shown with respect to (d), to embed the housing 32 with a flange 34 which projects radially by way of example (similarly to (a) or (b)) directly by foam-coating, injection-molding, or the like, in the forming material 12 of the cushion.

The embodiment (e) in FIG. 2, FIG. 3 shows a variant in which the cylindrical housing 32, in a state adapted in terms of the outer diameter to a clear inner width of the channel 16, is fixed at the provided axial position in the channel 16 by an adhesive connection (alternatively, by welding, in particular of the directly involved materials of the subassemblies 12 and 32, respectively). The first and second fixing means according to the invention should then be understood to be such a non-releasable adhesive or welding connection in this regard.

Figure 4:
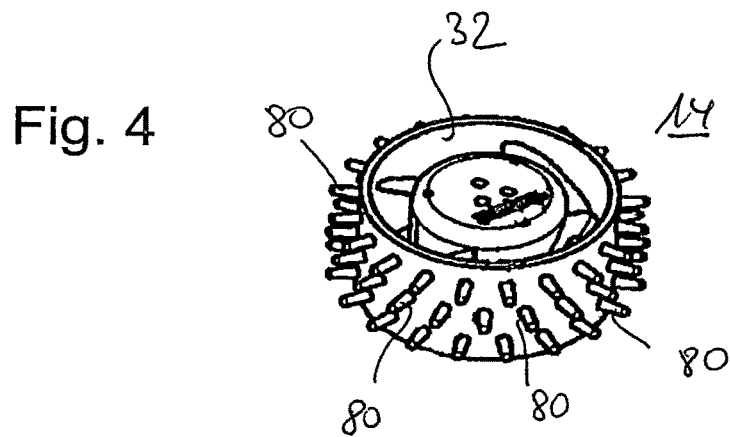
FIG. 4 is a perspective view of a ventilator unit with needle-like projections which extend from an outer covering of the ventilator housing in accordance with the variant (f) in FIG. 2, FIG. 3.

Finally, the embodiment (f), additionally in conjunction with the perspective view of FIG. 4, shows an embodiment of the ventilator unit in which the outer housing 32 thereof is provided with a large number of radially outwardly directed tip portions 80 which taper in an acute manner at the end side and which are constructed to hook or secure in or with a surrounding wall portion of the channel 16 of the foam material. Such a construction form is particularly suitable for harder or less resilient foam material, wherein the specific construction, in a particular arrangement or formation of the respective tip portions, is also here dependent on the context and determined by a respective use and application. FIG. 4 explains in this regard that, in three layers which are horizontally spaced apart from each other, the projecting tip portions 80 are integrally formed on the cylindrical housing shell 32 and are arranged along the periphery at intervals which are substantially uniform.

The present invention is not limited to the embodiments set out. Thus, for example, additional variants, also combinations which are not directly set out, of the first possible formations shown on the ventilator housing of the first fixing means can be made possible with second fixing means accordingly provided at the inner region of the channel 16, which fixing means achieve the intended fixing purpose.

The invention claimed is:

1. A device for ventilating a vehicle seat having a cushion (12) which is resilient with respect to user contact and which is constructed to form a seat and/or back contact face (24) and which has an air flow channel (16, 17) which forms an air outlet (15) in the direction toward the seat or back contact face, an air-permeable covering unit (18) which is formed in order to at least partially cover the air outlet, and a ventilator rotor (30) which is associated with the air flow channel and which is driven in an electro-motive manner and a ventilator unit (14) which has a ventilator housing (32) which at least partially radially surrounds the ventilator rotor, wherein the covering unit and the ventilator unit are fixed on or in the cushion with spacing from each other along the air flow channel and without direct connection of portions of the covering unit and the ventilator unit, and the ventilator housing has at the peripheral and/or outer side first fixing means (34; 32; 80) which are constructed in order to secure the ventilator unit in the air flow channel by engaging in and/or in order to cooperate with second fixing means (12; 70; 74) which are provided on or in an inner wall portion of the air flow channel, wherein the first fixing means have projection and/or flange portions which are at least partially provided at the outer side and/or which project radially and which are constructed for introduction in a foam material of the cushion forming the second fixing means, and wherein the projection portions of the first fixing means are constructed as needle portions which taper in a radially acute manner and which are arranged so as to be distributed uniformly around an outer periphery of the ventilator housing.

2. The device as claimed in claim 1, wherein the ventilator unit is inserted in the air flow channel so that the material of the cushion (12) engages in a fixing manner at the peripheral or outer side on the ventilator housing (32, 34) thereof by cooperation of the first and second fixing means.

3. The device as claimed in claim 1, wherein the air flow channel extends through the cushion (12) in a transverse direction relative to the seat or back contact face.

4. The device as claimed in claim 1, wherein a spacing which is dimensioned in the direction of the air flow channel between an outlet-side end of the ventilator housing and a portion of the covering unit, which portion covers the air outlet, is at least 20% of the diameter of the ventilator rotor (30).

5. The device as claimed in claim 1, wherein the flange portions cooperate in an engaging manner directly with the foam material thereof at least partially in a resiliently compressing manner and/or in grooves, cutouts and/or undercuts of the foam material.

6. The device as claimed in claim 1, wherein the first fixing means are introduced by at least partial foam-coating of the ventilator housing, in particular during a production operation of the cushion.

7. The device as claimed in claim 5, wherein the flange portions are configured to produce a lifting/catch coupling, in particular a bayonet type connection, so as to be movable along a longitudinal flow channel axis axially counter to a resilient counter-force of the foam material and/or rotatable about the longitudinal flow channel axis.

8. The device as claimed in claim 1, wherein the second fixing means are constructed as a rigid subassembly which is constructed to produce a connection with the first fixing means and which at least partially surrounds the ventilator housing at the peripheral side in an introduced state.

9. The device as claimed in claim 8, wherein the first and second fixing means are constructed in such a manner that a locking action can be carried out between the rigid subassembly and the ventilator housing by a snap-fit, clip-fit, lifting/rotation and/or catch connection.

10. The device as claimed in claim 1, wherein the first and second fixing means are constructed as a non-releasable connection of the ventilator housing in the surrounding air flow channel which has a foam material.

11. The device as claimed in claim 1, wherein the air flow channel has an annular collar which provides an axial stop for the ventilator housing.

12. The device as claimed in claim 1, wherein the cushion has, in order to produce the second fixing means or to introduce them, an additional foam material portion which has predetermined different resilience, compression, strength, adhesion and/or melting properties with respect to a surrounding foam material of the cushion.

13. The use of the device as claimed in claim 1 for a passenger vehicle seat.

14. The device as claimed in claim 1, wherein the air-permeable covering unit is constructed so as to be rigid and/or grid-like.

15. The device as claimed in claim 4, wherein the spacing is at least 50%.

16. The device as claimed in claim 8, wherein the second fixing means are embedded in a foam material of the cushion and/or foam-coated by the foam material.

17. The device as claimed in claim 10, wherein the connection is produced by adhesive bonding and/or welding.

18. The device as claimed in claim 11, wherein the annular collar provides the axial stop in a state formed in a foam material of the cushion.

* * * * *